United States Patent
Zhang et al.

(10) Patent No.: US 8,804,643 B2
(45) Date of Patent: Aug. 12, 2014

(54) METHOD FOR ENABLING MULTI-CHANNEL SIGNALING IN A COMMUNICATION NETWORK

(75) Inventors: Wenhui Zhang, Heidelberg (DE); Andreas Festag, Ladenburg (DE); Roberto Baldessari, Heidelberg (DE); Long Le, Dossenheim (DE)

(73) Assignee: NEC Europe Ltd., Heidelberg (DE)

( * ) Notice: Subject to any disclaimer, the term of this patent is extended or adjusted under 35 U.S.C. 154(b) by 64 days.

(21) Appl. No.: 13/393,888

(22) PCT Filed: Sep. 1, 2010

(86) PCT No.: PCT/EP2010/005359
§ 371 (c)(1),
(2), (4) Date: Apr. 12, 2012

(87) PCT Pub. No.: WO2011/026611
PCT Pub. Date: Mar. 10, 2011

(65) Prior Publication Data
US 2012/0188964 A1    Jul. 26, 2012

(30) Foreign Application Priority Data

Sep. 2, 2009  (EP) .................................... 09011253

(51) Int. Cl.
H04W 4/00      (2009.01)
H04W 72/04     (2009.01)
H04W 84/18     (2009.01)
H04W 28/06     (2009.01)

(52) U.S. Cl.
CPC .......... *H04W 72/0406* (2013.01); *H04W 84/18* (2013.01); *H04W 28/06* (2013.01)
USPC ....................................................... 370/329

(58) Field of Classification Search
None
See application file for complete search history.

(56) References Cited

U.S. PATENT DOCUMENTS

| 8,451,786 B2* | 5/2013 | Stahlin et al. ................. 370/329 |
| 2008/0232309 A1* | 9/2008 | McNew et al. ................ 370/329 |

(Continued)

FOREIGN PATENT DOCUMENTS

| WO | 2007/021158 | 2/2007 |
| WO | 2009/029424 | 3/2009 |

OTHER PUBLICATIONS

International Search Report dated Dec. 28, 2010, corresponding to PCT/EP2010/005359.

(Continued)

*Primary Examiner* — Suk Jin Kang
(74) *Attorney, Agent, or Firm* — Young & Thompson

(57) ABSTRACT

A method for enabling multi-channel signaling in a communication network, including a multitude of communication nodes, wherein the communication among the communication nodes is performed by sending and receiving messages on communication channels including a control channel and at least one service channel, is characterized in that communication nodes embed information related to communication channel usage in messages sent on one of the communication channels, in particular the control channel, wherein the information indicates to others of the communication nodes a communication channel, in particular a service channel, intended to be employed for a specific service and/or application by the communication node having sent the respective message, and wherein communication nodes that receive a message including information related to communication channel usage forward the information by embedding the information in any of their own messages to be sent on a communication channel, in particular on the control channel.

21 Claims, 2 Drawing Sheets

| Network Header | Channel usage information | Transport Header | Payload |

(56) References Cited

U.S. PATENT DOCUMENTS

| | | | |
|---|---|---|---|
| 2008/0232433 A1* | 9/2008 | McNew et al. | 375/140 |
| 2009/0061885 A1* | 3/2009 | Eastlake, III | 455/450 |
| 2009/0103460 A1* | 4/2009 | Oh et al. | 370/280 |
| 2009/0201851 A1* | 8/2009 | Kruys et al. | 370/328 |
| 2009/0296680 A1* | 12/2009 | Suzuki et al. | 370/342 |
| 2010/0225414 A1* | 9/2010 | Gorbachov | 333/101 |
| 2010/0226291 A1* | 9/2010 | Gorbachov | 370/280 |
| 2010/0226292 A1* | 9/2010 | Gorbachov | 370/280 |
| 2011/0026472 A1* | 2/2011 | Reumerman et al. | 370/329 |
| 2011/0098877 A1* | 4/2011 | Stahlin et al. | 701/33 |
| 2011/0128849 A1* | 6/2011 | Guo | 370/235 |
| 2011/0128902 A1* | 6/2011 | Guo | 370/312 |
| 2011/0294447 A1* | 12/2011 | Hu et al. | 455/154.1 |
| 2011/0306353 A1* | 12/2011 | Kim et al. | 455/452.2 |
| 2012/0004804 A1* | 1/2012 | Beams et al. | 701/32.7 |
| 2012/0149389 A1* | 6/2012 | Lin et al. | 455/456.1 |

OTHER PUBLICATIONS

IEEE Trial-Use Standard for Wireless Access in Vehicular Envioroments (WAVE)—Multi-Channel Operation; IEE Standard: pp. C1-74; Jan. 1, 2006.

Amadeo et al, "A WAVE-compliant MAC Protocol to Support Vehicle-to-Infrastructure Non-Safety Applications", Proc. of Int. Conf. on Communications Workshops, Jun. 14, 2009, pp. 1-6.

English translation of Japanese Office Action, dated Feb. 14, 2013, from corresponding JP application.

\* cited by examiner

| Network
Header | Channel usage
information | Transport
Header | Payload |
|---|---|---|---|

Fig. 2

| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|
| Length | | | | | | | | Channel ID | | | | | | | | Life time | | | | | | | | Number of hops | | | | | | | |
| Application ID 1 and priority | | | | | | | | | | | | | | | | Application ID 2 and priority (optional) | | | | | | | | | | | | | | | |
| More Application IDs and priorities (optional) | | | | | | | | | | | | | | | | | | | | | | | | | | | | | | | |

Fig. 3

METHOD FOR ENABLING MULTI-CHANNEL SIGNALING IN A COMMUNICATION NETWORK

CROSS-REFERENCE TO RELATED APPLICATIONS

The present application claims the benefit of priority to, and is a national stage of, PCT App. No. PCT/EP2010/005359, filed Sep. 1, 2010, which claims the benefit of priority to EP 09011253.3, filed Sep. 2, 2009.

BACKGROUND OF THE INVENTION

1. Field of the Invention

The present invention relates to a method for enabling multi-channel signaling in a communication network, in particular in a vehicular ad hoc network, wherein said communication network comprises a multitude of communication nodes, wherein the communication among said communication nodes is performed by way of sending and receiving messages on communication channels, wherein said communication channels include a control channel and at least one service channel.

2. Description of the Related Art

Vehicular communication is considered as key technology for Intelligent Transport Systems (ITS) because the vehicular communication has the capability to increase road safety and traffic efficiency. For this purpose, the mature, inexpensive, and widely available 802.11 wireless LAN technology appears very attractive. In the field of vehicular communication, vehicles are equipped with wireless transceivers and can spontaneously form an ad hoc network among them. Vehicles acting as network nodes can use the ad hoc network to communicate with each other in order to support safety applications such as cooperative collision warning.

Recognizing the potential of vehicular communication, the European Commission has recently allocated a 30-MHz frequency band (5875-5905 MHz) for safety-related communication of Intelligent Transport Systems (Commission Decision of Aug. 5, 2008 on the harmonized use of radio spectrum in the 5875-5905 MHz frequency band for safety-related applications of ITS, 2008/671/EC). Additional frequency bands for vehicular communication have been planned for the future. While the European Commission has not specified how this frequency band will be used, based on the current status of standardization activities in ETSI TC ITS (European Technical Standards Institute Technical Committee Intelligent Transport Systems), it is expected that this frequency band will be divided into one 10-MHz control channel (CCH) and two 10-MHz service channels (SCH1 and SCH2). Exemplary it is referred to the Paper Long Le et al., "Analysis of Approaches for Channel Allocation in Car-to-Car Communication", 1st International Workshop on Interoperable Vehicles (IOV 2008), pages 33-38, Zurich, Switzerland, March 2008, describing the analysis for such channel allocation. With additional frequency bands to be allocated in the future, it is expected that there will be more service channels. Therefore, vehicular communication in Europe will feature multi-channel operation.

Further, as the automotive industry requires that a vehicle is constantly able to receive messages sent on the control channel, the most appropriate solution according to currently and short/mid-term available hardware consists of a dual transceiver communication system including two transceivers operating in this frequency band. One of these transceivers will operate in the control channel that is dedicated to the exchange of periodic messages and event-driven warning messages for active safety applications. The other transceiver will operate alternately on service channels and will be used for other ITS-related communication purposes.

In the USA a 75-MHz frequency band (5.855-5.925 GHz) has been allocated for Dedicated Short Range Communications (DSRC), which is divided into a single CCH and six SCHs. The multi-channel operation follows the IEEE P1609.4 standard which prescribes that a single transceiver constantly switches between the CCH and one of the SCHs. There is no "always on" channel, but all communication nodes will periodically switch to the CCH.

Consequently, there are multiple wireless channels for inter-vehicular communication both in the USA and Europe and furthermore, there are two types of channels for vehicular communication systems. The first channel type is the control channel, and there will be an envisaged period of time that all communication nodes will switch their transceivers onto the control channel. In case there are a multitude of transceivers, one transceiver will be always tuned to the control channel. In case that a single transceiver is provided, the transceiver uses channel switching between the control channel and other channels. The second type of channel is the service channel, which is used by a communication node only occasionally and wherein it is not expected that all communication nodes will tune their transceivers on the service channel at expected points of time.

The IEEE 802.11 standard (IEEE Std 802.11™-2007, IEEE Standard for Information technology—Telecommunications and information exchange between systems—Local and metropolitan area networks—Specific requirements Part 11: Wireless LAN Medium Access Control (MAC) and Physical Layer (PHY) Specifications) prescribes distributed signaling at the MAC layer, which is used to coordinate beacon generation in an IBSS (Independent Basic Service Set). All WLAN stations in an IBSS synchronize their beacon generation by adopting the same beacon period when joining the IBSS. Such signaling can be employed for a signal transceiver system running on a single channel.

A multi-channel signaling mechanism is described in WO 2007/021158 A1. The disclosed technique addresses a signaling method and system for indicating and selecting a channel suitable for a data transmission, whereby the suitable channel is indicated by means of a channel index embedded in the Request-To-Send (RTS) and Clear-To-Send (CTS) frames defined in an IEEE 802.11 WLAN. Although the proposed technique addresses multiple channels, it is only applicable to single transceiver systems. Further, this multi-channel signaling mechanism operates on a per-packet basis and incurs a considerable signaling overhead.

The IEEE 1609.3 standard (IEEE Std 1609.3™-2007, IEEE Trial-Use Standard for Wireless Access in Vehicular Environments (WAVE)—Networking Services) prescribes that applications can choose to send their traffic in the context of a WBSS (WAVE basic service set). Such a signaling method is based on IEEE 1609.4 systems that are described in IEEE Std 1609.4™-2006, IEEE Trial-Use Standard for Wireless Access in Vehicular Environments (WAVE)—Multi-channel Operation. The mentioned method features a single transceiver and multiple channels. The system requires transceivers from all communications peers synchronize to the UTC (Universal Time Coordinated) time and defines a "Sync Interval" within which each transceiver will switch between the single CCH and one of the multiple SCHs. The same procedure will be repeated in each "Sync Interval". A WBSS is established to support traffic to/from specific applications, and its presence is announced for other devices with compatible applications to join. Devices take the role of either provider or user on a given WBSS. The provider generates messages called WAVE announcements to inform other devices of the existence of the WBSS and the presence of the associated application service(s). The user's role is assumed by any devices that join the WBSS based on receipt of the announcement. The WBSS is initiated at the request of the application at one device (the provider), and announced on the CCH. Since WAVE announcements are only received by single hop communication peers, the resulting communication using the WBSS is also limited to single hop communication. In addition, if the number of nodes is high, the number of WAVE announcements may also be high. Although IEEE 1609.3 is based on IEEE 1609.4 with single transceiver, its method may also be applied to multi-transceiver systems. However, the main limitation of IEEE 1609.3 is that it only allows single-hop communication.

Applications that are used for road safety or traffic efficiency normally are not interested in which communication channel will be used. The common way is that applications send requested service messages to the network layer, and the network layer will send application messages on a certain channel based on certain mapping rules or network management functions. The mapping of an application to a communication channel can be based on a policy, in that a certain application shall only run on a certain channel. Or the applications are mapped to a channel dynamically based on network management functions due to load balancing reasons or interference in channels. For certain applications, such as critical safety applications, the messages are simply sent on the control channel. However, if an application should use a service channel, the network layer cannot determine if other communication peers are also using the same service channel since the service channel is not always on.

In addition to communication channel, vehicular communication may involve different access technologies, different transport and/or network protocols, and different quality of service requirements on the communication, which can be described as communication profile.

Therefore, there is a need to signal the intended usage of a service channel, more generally, the communication profile, in order to get other communication peers involved. The signaling should be done in a way to hide routing and channel related details from applications. Since many applications require vehicular communication to cover a certain area, which goes beyond the coverage of single hop communication, the signaling shall also have the capability to reach beyond a single hop. Moreover, since the communication scenario considered in this invention is at the network layer and may extend to several hops, the signaling for multi-channel using MAC layer protocols will not be appropriate since it only covers a single hop.

There are a number of challenges for multi-channel signaling:
1. Signaling is in a distributed ad hoc manner without any central coordination.
2. There are potentially a large number of nodes, and each may start multi-channel signaling. But there is very limited bandwidth available in the control channel, thus it must be very efficient in terms of bandwidth usage.
3. The signaling needs to go beyond a single hop without complex forwarding mechanisms.

For the multi-transceiver, multi-channel vehicular communication system in Europe, there is no method for signaling multi-channel usage. ETSI TC ITS still has not addressed this problem so far. Several possibilities are noted in the following that reflecting typically what approaches in this area are followed.

One possible approach is to follow IEEE 1609.3: Using one transceiver on the CCH to send messages similar to "WAVE announcements" to signal the intended usage of a certain service channel. As already mentioned, this approach does not support multi-hop communication.

Another problem with the IEEE 1609.3 approach is the bandwidth limitation. In Europe, the CCH will mainly be used for important active safety applications, and it has to carry periodic and event-driven messages. To allow each communication node send messages similar to "WAVE announcements" whenever there is a need to use a SCH would increase the number of packets and thus the load on the CCH. Hence, the IEEE 1609.3 approach is not an efficient solution.

To support multi-hop communication, a straightforward way is to forward a signaling message for multiple hops in order to extend the dissemination area. There are already methods available for forwarding, such as topologically broadcast, which forwards a message for a predefined number of hops, and geographical broadcast, which forwards a message to a geographical area. However, such multi-hop forwarding often leads to many packet retransmissions, and is not suitable on the CCH.

BRIEF SUMMARY OF THE INVENTION

It is therefore an object of the present invention to improve and further develop a method for enabling multi-channel signaling in a communication network of the initially described type in such a way that, by employing mechanisms that are readily to implement, an efficient multi-channel signaling that supports service announcements in a multi-hop vehicular communication system is provided.

In accordance with the invention, the aforementioned object is accomplished by a method comprising the features of claim 1. According to this claim, such a method is characterized in that communication nodes embed information related to communication channel usage in messages that are sent on one of said communication channels, in particular said control channel, wherein said information indicates to others of said communication nodes a communication channel, in particular a service channel, that is intended to be employed for a specific service and/or application by the communication node having sent the respective message, and wherein communication nodes that receive a message including information related to communication channel usage forward said information by embedding said information in any of their own messages to be sent on a communication channel, in particular on said control channel.

According to the invention it has first been recognized that an enormous improvement concerning an efficient multi-channel signaling can be achieved by communication nodes embedding information related to communication channel usage in a message that is sent on one of the communication channels. In doing so, the information related to communication channel usage can be embedded in existing messages and/or messages that have to be sent anyway. Specifically, the information can be embedded in messages that are sent on the control channel, which is of particular advantage because it can be assumed that the communication nodes are constantly able to receive messages sent on the control channel or there is an envisaged period of time that all communication nodes will switch their transceivers onto the control channel. A service channel may also be used to send information related to communication channel usage. However, since not all communication nodes may switch to the same service channel at the same time, using the service channel may not be as effective as using the control channel. Furthermore, according to the invention the information related to communication channel usage indicates to others of the communication nodes a communication channel, in particular a service channel, that is intended to be employed for a specific service and/or application by the communication node having sent the respective message. Further, it has been recognized that the communication nodes that receive a message including information related to communication channel usage may forward the information related to communication channel usage by embedding the information in any of their own messages, i.e. in any of the receivers' outgoing messages, to be sent on a communication channel, in particular on the control channel. Preferably, the communication nodes may embed the information in their next own message to be sent on the control channel. Thus, the signaling has the capability to reach beyond a single hop. Since many applications require vehicular communication to cover a predetermined area, which goes beyond the coverage of a single hop communication, this integrated approach of embedding and forwarding information is especially advantageous. As will be explained in some more detail below, conditions and algorithms may be applied that regulate and/or govern the forwarding of received information by means of embedding it again in receivers' outgoing messages.

Thus, in case any application message is to be sent on a dedicated channel, e.g. according to some policy to map an application to a specific service channel or to some network management functions that dynamically select a channel for a predetermined message, the usage of the intended channel, in particular a service channel, is signaled to other communication nodes. Therefore, the signaling is done in an efficient way for multi-hop vehicular communication systems and, in addition, hides routing and channel related details from applications.

According to a preferred embodiment the information related to communication channel usage may be embedded in the messages by setting or coding the information in an extra data field that is readable by any of the communication nodes receiving the message. Specifically, the information may be put between the network header and the transport header of a message. Furthermore, the information may also be put after the transport header as part of payload or part of information that can be accessed by some middleware layer such as the facilities layer.

According to a further preferred embodiment the communication nodes may embed information related to communication channel usage in the messages only in case predetermined conditions are met. For example, in case when the load of the control channel is below a predefined threshold. Thus, the communication nodes may be allowed to send the information related to communication channel usage only under predetermined circumstances.

With regard to an adequate or high degree of dissemination of the information related to communication channel usage, the communication nodes may repeat the sending of information related to communication channel usage at predefined and/or regular intervals. Thus, by a persistent repeating of the sending of the same information at a predefined frequency, the validity of the information can be extended.

Advantageously, the messages that include information related to communication channel usage may be periodic or event-driven messages that are sent by communication nodes on the control channel. Since in the field of vehicular communication it may be assumed that on the control channel each communication node sends periodic messages, for example at the network layer, it is of particular advantage to employ these messages for transmitting and/or disseminating the information related to communication channel usage. In addition, each communication node may also send event-driven messages in case a certain event happens. To this end, it may be expected that each node will send periodic messages typically at the frequency of several Hertz and occasionally also event-driven messages on the control channel.

Furthermore, there may be mechanisms implemented to choose which messages will carry the information related to communication channel usage dependent on load or based on the priority of messages. Such an implemented mechanism may choose periodic messages only or all types of messages for embedding the information therein. The mechanism may also choose to generate independent signaling messages that are generated only for channel-usage signaling.

According to a preferred embodiment the messages that include information related to communication channel usage may be sent at the network layer. Thus, this embodiment deals with a network layer signaling mechanism related to channel announcement and/or channel usage information of service on a channel. It may also be provided that the method according to the invention is implemented at middleware layer, such as the facilities layer, or at the application layer.

Advantageously, the communication nodes that receive different information related to communication channel usage from other communications nodes may be configured to forward none, a part or all of the different information. The decision of forwarding none, a part or all of the different information may also be based on some policy. Thus, a forwarding communication node is flexible and can act according to its interests.

Advantageously, the forwarding of information related to communication channel usage may function as acknowledgement for involved communication nodes to be aware of potential peers for communication. Involved communication nodes are nodes that send and/or receive messages including such information and consequently are involved in the dissemination of such information. Thus, the source of an information related to communication channel usage and the forwarder of such information may know the potential peers for communication.

According to a preferred embodiment communication nodes that receive a message including information related to communication channel usage may forward the information only in case predetermined conditions are met. By applying appropriate algorithms the bandwidth usage can be significantly reduced with (almost) no degradation of the overall performance. For instance, such conditions may be based on, but not limited to, channel load, the number of communication nodes that have already sent the information and/or the relative location of the communication node.

In a preferred embodiment the forwarding of information related to communication channel usage may be limited by a timeout value and/or by a number of hops, wherein the timeout value or the number of hops are defined by a default setting or specified in the messages. Thus, the life time cycle and/or the degree of dissemination of the information related to communication channel usage may be controlled.

Advantageously, the information related to communication channel usage includes information on the life time of the information. Thus, a communication node being the source of information related to communication channel usage may have a non-persistent way of repeating messages having included this information. The source of this information sends a message including the information only once, and the validity of such a message is confined by a time period, wherein the life time of the information included in the message may be regulated and/or configured by a default setting or by being specified in the message.

Advantageously, the information related to communication channel usage may include identifiers of those applications that employ the indicated communication channels. Thus, the communication nodes receiving the information know which applications need the indicated communication channels and may act according to their interests.

Furthermore, it may be provided that the information related to communication channel usage includes information on the priority and/or the category of the applications.

In a preferred embodiment the information related to communication channel usage may include information on quality of service requirements on the communication. Thus, the different quality of service requirements that may be involved in vehicular communication can be considered by communication nodes receiving such information.

With regard to be aware of different transport and/or network protocols that may be involved in vehicular communication, it may be provided that the information related to communication channel usage includes information on a transport and/or network protocol.

Furthermore, it may be provided that the information related to communication channel usage includes information on the access technology employed by the communication node having issued the information.

Thus, in addition to signaling the intended usage of a service channel, the communication nodes may be informed about different quality of service requirements on communication, different transport and network protocols and/or different access technologies, which can be described as communication profile. Thereby, other communication peers are getting involved easier.

In a preferred embodiment the information related to communication channel usage may include timing information that specifies at which point of time receiving communication nodes are supposed to switch to a predetermined communication channel, in particular a service channel. This timing information can be absolute, e.g. UTC (Universal Time Coordinated) time format, or relative, e.g. communication nodes should switch to the service channel in 10 milliseconds after receiving the information related to communication channel usage.

Advantageously, communication nodes that receive a message including information related to communication channel usage adapt the information according to their own purposes of channel usage, in particular by adding another application to the communication channel indication and/or by extending the number of hops or life time of the information if these parameters are available.

According to a preferred embodiment the messages including information related to communication channel usage may further include a data field for identifying whether the information results from an initial embedding process, from a forwarding process, or from both. Thus, the receiver of the messages will know whether the information related to communication channel usage included in the received message is forwarded by a forwarder and therefore could be adapted and/or manipulated.

As already mentioned above, a communication node can embed information related to communication channel usage into any of its "normal" communication messages, i.e. into a message that has to be sent in connection with the communication node's normal operation. However, with regard to a scenario, in which a communication node does not send any messages during a predefined time period, it may be provided that a timer is set at the communication node for prescribing the maximum waiting time for sending a message including information related to communication channel usage. In case there is no message in which the information could be embedded before the maximum waiting time is expired, the communication node may generate and send an independent message including the information related to communication channel usage. Insofar, this message is an extra message only for indicating the information related to communication channel usage to other communication nodes. However, this may be only allowed when the load on the control channel is below a predefined threshold.

Furthermore, the method according to the invention may be applied to one transceiver doing channel switching between a control channel and multiple service channels. Moreover, the method according to the invention may be applied to multiple transceivers, one for the control channel which is always on, and another transceiver for at least one service channel.

In addition, a transceiver may switch between two different service channels in a synchronized way in that all communication nodes switch at defined time points or in an asynchronous way.

Further, it is noted that the method according to the invention may also be implemented in such a way that signaling of other management and/or control messages is enabled.

BRIEF DESCRIPTION OF THE DRAWINGS

There are several ways how to design and further develop the teaching of the present invention in an advantageous way. To this end it is to be referred to the patent claims on the one hand and to the following explanation of preferred embodiments of the invention by way of example, illustrated by the drawing on the other hand. In connection with the explanation of the preferred embodiments of the invention by the aid of the drawing, generally preferred embodiments and further developments of the teaching will be explained. In the drawings FIG. 2 is a schematic overview illustrating an embodiment example of a structure of a message including information related to communication channel usage, and FIG. 3 is a schematic overview illustrating an example of a structure of a data field including information related to communication channel usage, which is embedded in the message of FIG. 2.

DETAILED DESCRIPTION OF THE PREFERRED EMBODIMENTS

Figure 1:
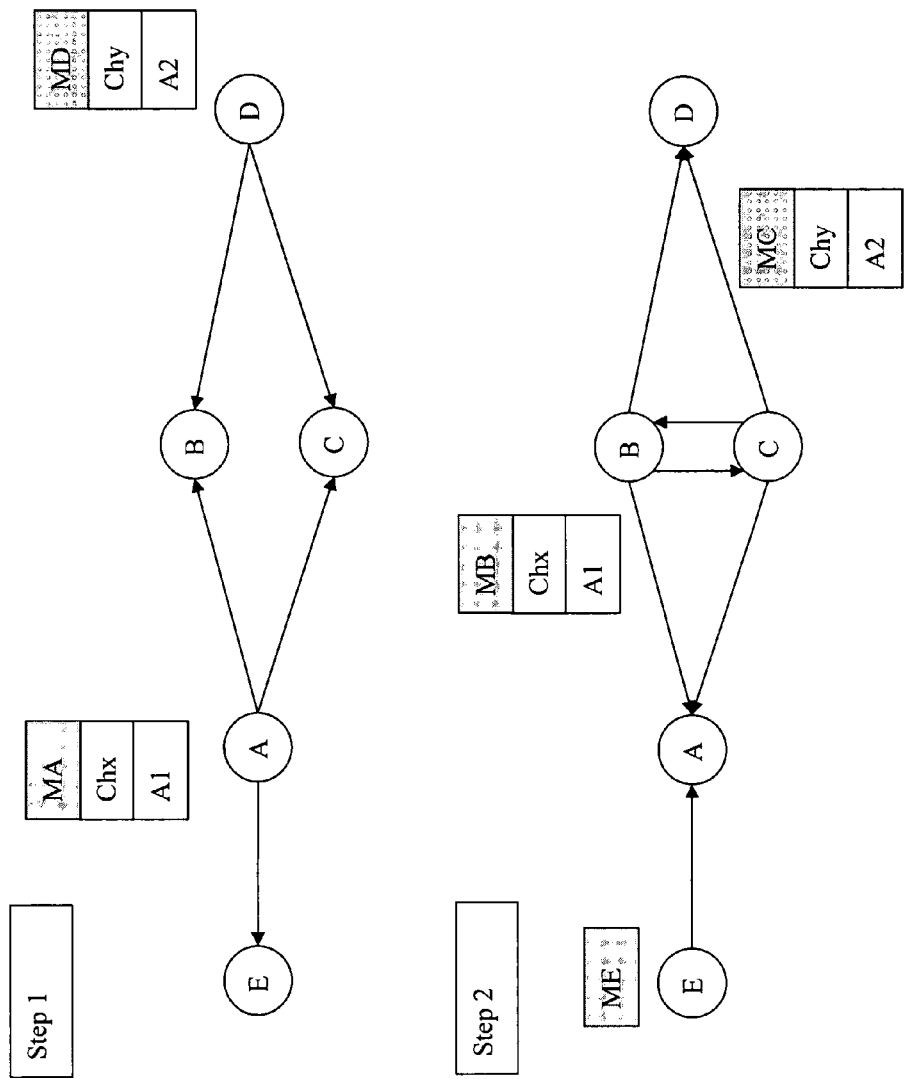
FIG. 1 is a schematic overview of an example of an application scenario of a method according to the present invention illustrating the signaling process of multiple communication nodes.

FIG. 1 shows a schematic overview illustrating an example of an application scenario of a method according to the present invention. FIG. 1 illustrates the signaling process of multiple communication nodes in two steps. Specifically, FIG. 1 illustrates a simple example with five communication nodes A, B, C, D and E. Messages that are sent by communication node A can be received directly by communication nodes B, C and E. Messages sent by communication node D can be received directly by communication nodes B and C.

In the first step, at a certain point of time, communication node A plans to use the channel Chx for the application A1. Communication node A embeds this information in its message MA, which is received by the communication nodes B, C and E. Meanwhile, communication node D plans to use channel Chy for the application A2, and communication node D embeds this information in its message MD. This message is received by communication nodes B and C.

The second step of FIG. 1 takes place shortly after the first step. Communication node B is also interested in using channel Chx for the application A1. Hence, communication node B embeds the information in its own message MB and sends it out, which is received by communication nodes A, C and D.

Communication node A will thus know that communication node B is interested in application A1 on channel Chx. However, communication node C is interested in using channel Chy for application A2, and communication node C embeds the information in its own message MC and sends it out, which is received by communication nodes A, B and D. Communication node D will thus know that communication node C is interested in application A2 on channel Chy. Communication node E is not interested in using neither channel Chx nor channel Chy, and thus communication node E simply sends its own message ME.

The information related to communication channel usage is embedded either in a periodic message or in an event-driven message and is sent on the control channel. The information includes the intended channel to be used and also the application that needs to use that channel. This extra information added to a periodic message or an event-driven message is coded in some extra data field, and this data field is read by any receiver of the message.

Once such a message is received by the communication nodes, in addition to process the original packet, the communication nodes also read the signaling information related to communication channel usage. The receivers check locally if they are also interested in switching to the announced service channel and decide if they will also use the announced channel. The decision to use a specific channel can be based on some policy. The receivers may also be interested in switching on the channel just to forward messages on behalf of other communication nodes.

If the receiver is interested in switching to the announced service channel, it will embed the channel usage information also in the next packet to be sent on the control channel.

Otherwise, the receiver will do nothing additionally. The extra information added to its own packet corresponds to the information of the channel usage, thus only limited data is added to its own packet. In this way, the channel announcement may be propagated beyond several hops.

The method according to the invention and in particular according to the embodiment illustrated in FIG. 1 has low overhead and adds only some additional bytes in existing messages. This results in low extra bandwidth usage. Further it does not require a complex routing protocol to forward the information. Thus, the method provides best-effort signaling, and other nodes can join if they are also interested, thus extending the possible coverage area. The forwarding of channel usage information functions as acknowledgement, so that the source and the forwarder of the information related to communication channel usage may know the potential peers for communication. Moreover, the possibility to dynamically select the best communication channel in order to balance load between different channels or to avoid interference is provided.

FIG. 2 shows a schematic overview illustrating an embodiment example of a structure of a message containing a data field that includes information related to communication channel usage. The data field is marked as Channel usage information in FIG. 2. The structure of the data packet illustrated in FIG. 2 is designed in the following order: Network header, Channel usage information, Transport header and Payload.

However, it is noted that the Channel usage information may also be put after the transport header as part of payload or part of information that can be accessed by the middleware layers such as the facilities layer.

FIG. 3 shows a schematic overview illustrating an example of a structure of a data field including information related to communication channel usage, which is embedded in the message of FIG. 2. The data field includes as parameters its length, Channel ID, Life time, Number of hops and multiple application IDs with the according priority of the applications.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for enabling multi-channel signaling in a communication network, the communication network being a vehicular ad hoc network, the method comprising:
communicating among a plurality of communication nodes of a communication network by sending and receiving messages on communication channels including a control channel and at least one service channel, each of the communication nodes embedding information related to communication channel usage in at least one of the messages that are sent on one of the control channel and the service channel, the information indicating to others of the communication nodes one particular service channel that is intended to be employed for a specific service and/or application by the communication node having sent the respective message, the information including information on the service channel and one or more of the specific service and the application, the specific service and the application being specified to be used with the particular service channel.

2. The method according to claim 1, wherein communication nodes that receive a message including information related to communication channel usage forward the information by embedding the information in any of messages of the receiving communication nodes to be sent on the control channel.

3. The method according to claim 1, wherein the information related to communication channel usage is embedded in the messages by setting or coding the information in an extra data field that is readable by communication nodes receiving the message.

4. The method according to claim 1, wherein the communication nodes embed the information related to communication channel usage in the messages only when a load of the control channel is below a predefined threshold.

5. The method according to claim 1, wherein the communication nodes repeat the sending of information related to communication channel usage at predefined and/or regular intervals.

6. The method according to claim 1, wherein the messages that include information related to communication channel usage are periodic or event-driven messages that are sent by the communication nodes on the control channel, and/or wherein the messages that include information related to communication channel usage are sent at a network layer.

7. The method according to claim 1, wherein the communication nodes that receive different information related to communication channel usage from other communications nodes are configured to forward none, a part or all of the different information.

8. The method according to claim 1, wherein the forwarding of information related to communication channel usage functions as acknowledgement for involved communication nodes to be aware of potential peers for communication.

9. The method according to claim 1, wherein the communication nodes that receive one of the messages including information related to communication channel usage forward the information only when predetermined conditions are met, and wherein the predetermined conditions consider one or more of channel load, the number of communication nodes that have already sent the information and a relative location of the communication node.

10. The method according to claim 1, wherein the forwarding of information related to communication channel usage is limited by a time-out value and/or by a number of hops, wherein the time-out value or the number of hops are defined by a default setting or specified in the messages.

11. The method according to claim 1, wherein the information related to communication channel usage includes information on a lifetime of the information, and/or applications that employ the indicated communication channels, and/or a priority and/or a category of the applications, and/or quality of service requirements on the communication, and/or a transport and/or network protocol, and/or an access technology.

12. The method according to claim 1, wherein the information related to communication channel usage includes timing information that specifies at which point of time receiving communication nodes are supposed to switch to a predetermined communication channel, the predetermined communication channel being one of the at least one service channel.

13. The method according to claim 1, wherein the communication nodes that receive a message including information related to communication channel usage adapt the information according to purposes of channel usage of the communication nodes by adding another application to the communication channel indication and/or by extending a number of hops or a lifetime of the information.

14. The method according to claim 1, wherein the messages including information related to communication channel usage further include a data field to identify whether the information results from one or more of an initial embedding process and a forwarding process.

15. The method according to claim 1, wherein a timer is set at the communication nodes to prescribe a maximum waiting time for sending a message that includes information related to communication channel usage, and wherein when no message in which said information could be embedded is scheduled before the maximum waiting time is expired, the communication nodes send an independent message only to indicate the information.

16. The method according to claim 2, wherein the information related to communication channel usage is embedded in the message by setting or coding information in an extra data field that is readable by communication nodes receiving the message.

17. The method according to claim 1, wherein the one of the messages is sent on the control channel.

18. The method according to claim 1, wherein the one of the messages is sent on the service channel.

19. The method according to claim 1, wherein the information related to the communication channel usage is embedded in one or more of existing messages and messages that already have to be transmitted.

20. The method according to claim 1, wherein communication nodes that receive a message including the information check locally whether the receiving communication nodes are interested in switching to the announced service channel and decide whether the receiving communication nodes will additionally use the announced service channel.

21. The method according to claim 1, wherein an optimal communication channel is dynamically selected in order to balance a load between different channels or to avoid interference.

* * * * *